US011954843B2

(12) United States Patent
Seshayya et al.

(10) Patent No.: US 11,954,843 B2
(45) Date of Patent: Apr. 9, 2024

(54) COMPONENT TRACKING IN AUTOMATED MANUFACTURING USING DIGITAL FINGERPRINTS

(71) Applicant: Lennox Industries Inc., Richardson, TX (US)

(72) Inventors: Satish Seshayya, Plano, TX (US); Vinay R. Thatigutla, Frisco, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 18/315,598

(22) Filed: May 11, 2023

(65) Prior Publication Data

US 2023/0281783 A1  Sep. 7, 2023

Related U.S. Application Data

(63) Continuation of application No. 17/035,617, filed on Sep. 28, 2020, now Pat. No. 11,694,321.

(51) Int. Cl.
*G06T 7/00* (2017.01)
*G06T 7/11* (2017.01)
*G06T 7/246* (2017.01)

(52) U.S. Cl.
CPC .............. *G06T 7/0004* (2013.01); *G06T 7/11* (2017.01); *G06T 7/246* (2017.01); *G06T 7/0008* (2013.01); *G06T 7/0012* (2013.01); *G06T 2207/30136* (2013.01); *G06T 2207/30164* (2013.01)

(58) Field of Classification Search
CPC . G06T 2207/30136; G06T 2207/30164; G06T 7/0004; G06T 7/0008; G06T 7/11; G06T 7/246
See application file for complete search history.

(56) References Cited

U.S. PATENT DOCUMENTS

2018/0285682 A1* 10/2018 Najibi ...................... G06T 7/194
2020/0311798 A1* 10/2020 Forsyth .............. G06Q 30/0631

OTHER PUBLICATIONS

Seshayya, S. et al., "Digital Fingerprints Generated from Coil Brazing," U.S. Appl. No. 17/035,585, filed Sep. 28, 2020, 47 pages.

* cited by examiner

*Primary Examiner* — Kenny A Cese
(74) *Attorney, Agent, or Firm* — Baker Botts L.L.P.

(57) ABSTRACT

A system is configured to receive an indication that an apparatus in a first assembled state should comprise a component with a first digital fingerprint and a component with a second digital fingerprint. The system is configured to receive video footage of apparatuses in the first assembled state. The system is configured to isolate an image of an apparatus in the first assembled state. The system is configured to split the image into a frame comprising a first component and a frame comprising a second component. The system is configured to identify feature points and to determine that the first set of feature points matches the first digital fingerprint and that the second set of feature points matches the second digital fingerprint. The system is configured to update a component database.

17 Claims, 13 Drawing Sheets

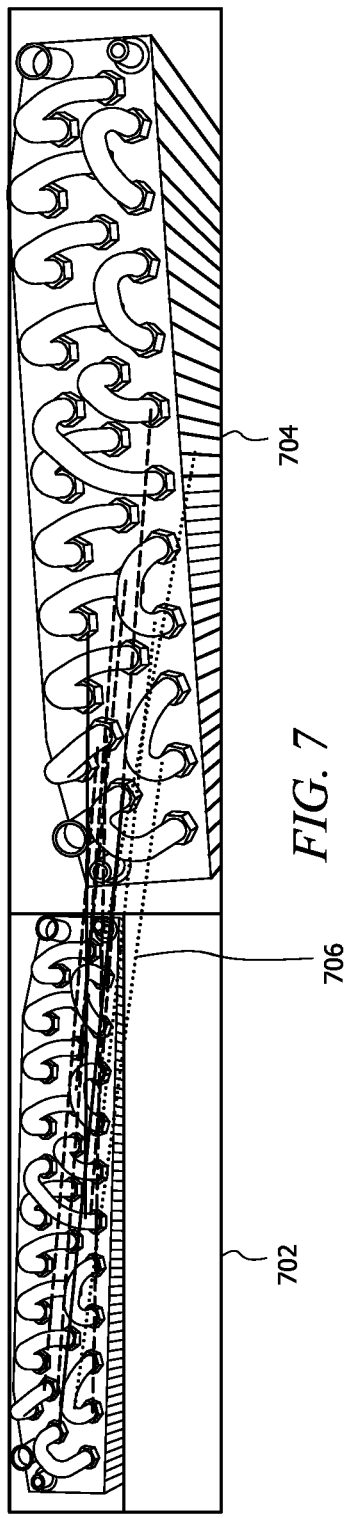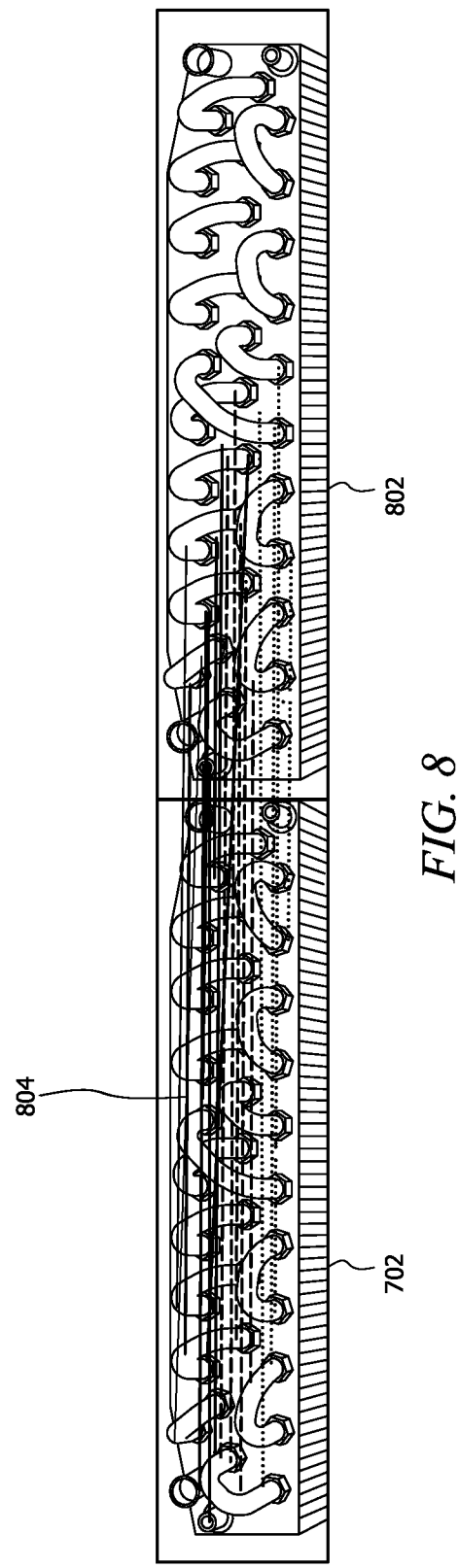
FIG. 7
FIG. 8

COMPONENT TRACKING IN AUTOMATED MANUFACTURING USING DIGITAL FINGERPRINTS

CROSS-REFERENCE TO RELATED APPLICATION

The application is a continuation of U.S. patent application Ser. No. 17/035,617, filed Sep. 28, 2020, and entitled "COMPONENT TRACKING IN AUTOMATED MANUFACTURING USING DIGITAL FINGERPRINTS," which is incorporated herein by reference.

TECHNICAL FIELD

This disclosure relates generally to image analysis. More specifically, this disclosure relates to component tracking in automated manufacturing using digital fingerprints.

BACKGROUND

Mass production of evaporator coils uses automated brazing. While manufacturing machines can produce consistent brazes, there are scenarios where the brazing completed by the machine is faulty. For example, wobble in the conveyor belt transporting components through the brazing process may result in an abnormal brazing pattern. One of the technical challenges that occur when attempts are made to detect defective coils during the automated brazing process is that direct observation of the components and the conveyor belt on which they ride is not possible given the high temperatures inside the brazing chamber. These high temperatures also preclude the use of tagging mechanisms like barcodes because the high temperatures would alter or damage any tagging. Even when the coils are outside of the brazing chamber, tracking and identification is complicated by the introduction of a variety of fittings and additional tubing that obscures various sections of the evaporator coil.

SUMMARY OF THE DISCLOSURE

According to one embodiment, a system for tracking components in an automated manufacturing line includes a camera and a component tracking tool. The camera is configured to record video of apparatuses in a first assembled state. The first assembled state includes a first component of a first type, and a second component. The second component may be of the first type or of a second type. The first component has a digital fingerprint comprising a plurality of feature points. The second component has a second digital fingerprint comprising a plurality of feature points that are different from those of the first fingerprint.

The component tracking tool includes a memory and a hardware processor. The memory is configured to store one or more filtering algorithms. The hardware processor is configured to receive an indication that an apparatus in the first assembled state should comprise a component with the first digital fingerprint and a component with the second digital fingerprint. The hardware processor is further configured to receive video footage from the camera. The hardware processor is configured to convert the video footage to greyscale. The hardware processor is then configured to isolate a first frame from the greyscale video footage. The first frame comprises an image of an apparatus in the first assembled state. The hardware processor is further configured to split the first frame into a second and a third frame. The second frame comprises the first component of the first type. The third frame comprises the second component. The hardware processor is then configured to apply at least one filtering algorithm to the second and third frames to generate a first and second filtered image.

The hardware processor is further configured to generate a first set of feature points from the first filtered image and a second set of feature points from the second filtered image. The feature points are generated using a feature detection algorithm. The hardware processor is configured to determine that the first set of feature points from the first filtered image matches the feature points comprising the first digital fingerprint. The hardware processor is also configured to determine that the second set of feature points from the second filtered image matches the feature points comprising the second digital fingerprint. The hardware processor is further configured to update a component database. The database is updated with a third digital fingerprint based on the apparatus in the first assembled state. The database is also updated with a date and time when the apparatus in the first assembled state was assembled. The database is further updated with an indication that the apparatus in the first assembled state is associated with the first and second digital fingerprints.

Certain embodiments provide one or more technical advantages. As an example, an embodiment improves the tracking of HVAC evaporator coil components through high-heat processes like brazing metal tubing. Some embodiments generate digital fingerprints that permit the tracking of components even when additional components are added to the apparatus under construction. In other embodiments, the digital fingerprint tracking system may also be used to identify production process defects by pinpointing when and where errors were made in the production process.

The system described in this disclosure may be integrated into a practical application of an image recognition system that can generate digital fingerprints and a component tracking system that can be used to follow HVAC evaporator coil slabs through the production process of evaporator coils. For example, the disclosed systems can develop a digital fingerprint from rotationally invariant feature points. Additionally, the disclosed systems can match digital fingerprints to frames extracted from a continuous video feed, even where components partially obscure the matching points.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 illustrates the comparison of a first digital fingerprint to a coil slab image that does not match;

FIG. 8 illustrates the comparison of the first digital fingerprint to a coil slab image that matches;

DETAILED DESCRIPTION

System Overview

Figure 1:
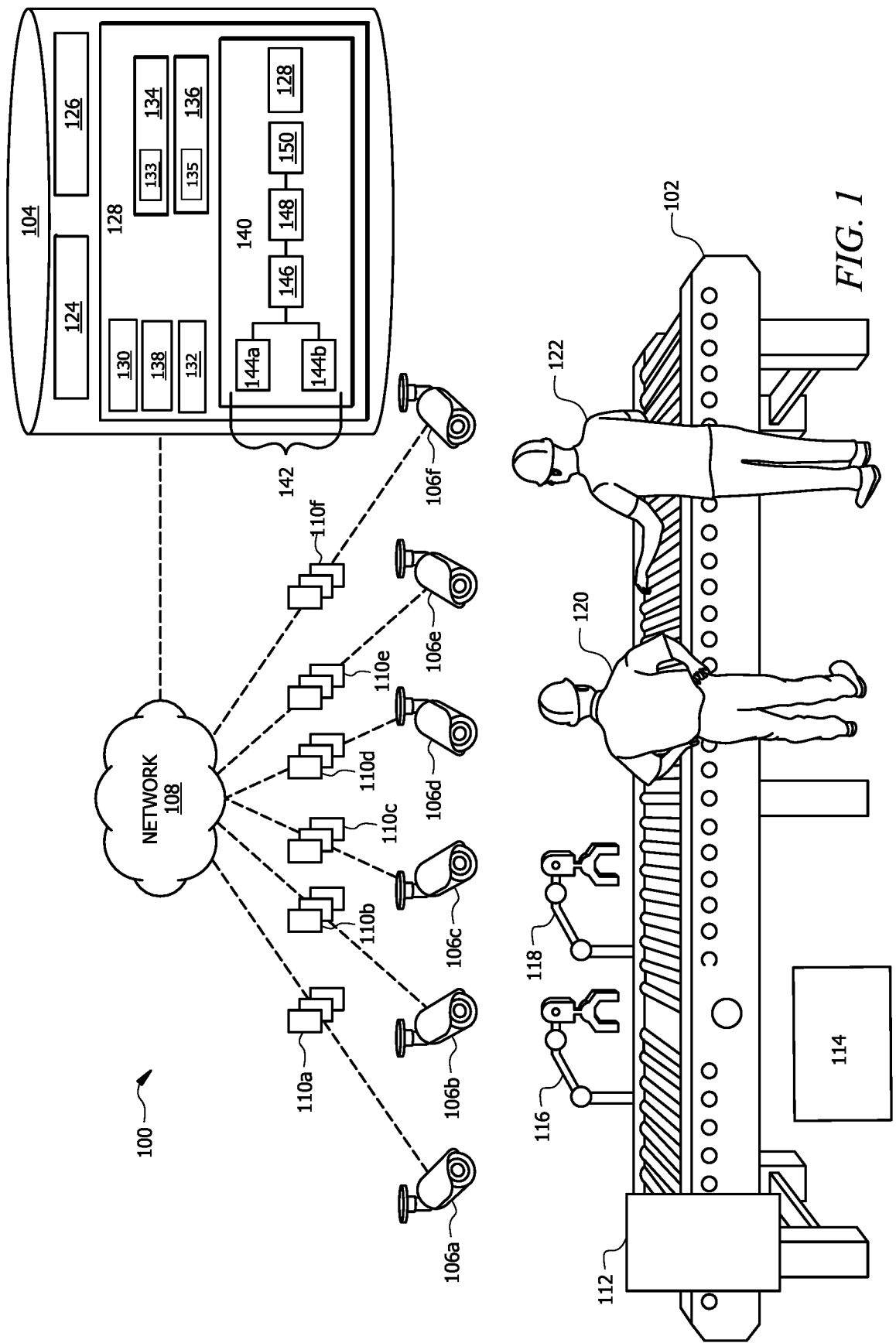
FIG. 1 illustrates an example system for component tracking using digital fingerprints.

FIG. 1 illustrates an example system 100 for component tracking using digital fingerprints. In one embodiment, the system 100 comprises a production line 102, a fingerprinting server 104, cameras 106, and network 108. The system 100 may be configured as shown in FIG. 1 or in any other suitable configuration. The components of system 100 communicate through network 108. This disclosure contemplates network 108 being any suitable network operable to facilitate communication between the components of the system 100. Network 108 may include any interconnecting system capable of transmitting audio, video, signals, data, messages, or any combination of the preceding. Network 108 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The component tracking system 100 is generally configured to use cameras 106 to monitor the progress of components as they are incorporated into an end-product on production line 102. The fingerprinting server 104 is configured to use video from cameras 106 to construct a unique digital fingerprint for each component that will allow tracking of through the final product. The fingerprinting server 104 is also capable of dynamically processing videos to read the digital fingerprints even when subsequent steps in the production line 102 may obscure parts of the component for which the digital fingerprint was generated. In this way, the disclosed system 100 may be incorporated into a system for identifying production issues stemming from malfunctions in production line equipment that might be incapable of direct observation. A further practical application of the disclosed systems and methods is a system for locating component batches after they are incorporated into an end-product, when the components suffer from production defects.

The ensuing discussion of system 100 uses HVAC evaporator coil production for illustrative purposes. However, the component tracking methods may be applied in other contexts.

Production Line

The example production line 102 in the example system 100 comprises an automatic brazer 112, a staging area 114, a coil assembly station 116, a fitting addition station 118, a manual brazing station 120, and a leak test station 122. The automatic brazer 112 is any robot configured to join metal parts via brazing or soldering. For example, the automatic brazer 112 may be configured to braze copper tubing joints on a HVAC evaporator coil slab. The automatic brazer 112 may be configured to braze a variety of metals at a variety of temperatures.

The staging area 114 is any area dedicated to storing components after they exit the automatic brazer 112 but before they move to the coil assembly area 116. For example, when the production line 102 is for manufacturing HVAC evaporator coils, the staging area 114 may store a plurality of slab coils that are awaiting assembly into coils. The coil assembly area is a where two slabs are joined together in a "V" shape to create an evaporator coil. Once the base "V" shape is created, additional tubing, wiring, and/or other fittings are installed in the fitting addition area 118. Additional tubing may be manually brazed in the manual brazing area 120. Once an HVAC evaporator coil is completed, a leak test is conducted in the leak test area 122 to identify any faulty brazing junctions.

Camera Network

The cameras 106 may be any device capable of capturing a motion picture and transmitting video data 110 to the fingerprinting server 104. The cameras 106 may record video in any of a number of file formats. For example, the cameras 106 may record video as a .mov, .wmv, .viv, .mp4, .mpg, .m4v, .flv formats. Those of ordinary skill in the art will recognize that a variety of other file formats may also be suitable. Each camera 106 is located so that it can capture a different part of a manufacturing process. This allows the disclosed system to identify components and track them throughout the manufacturing process.

For example, the camera 106a may be configured to record video data 110a of evaporator coil slabs after they exit an automatic brazer 112. The camera 106b may be configured to record video data 110b of evaporator coils that are stored in a staging area 114. The camera 106c may be configured to record video data 110c of an apparatus in a first assembled state. In the evaporator coil example, the first assembled state comprises two evaporator coil slabs joined together in a "V" shape. The camera 106d may be configured to record video data 110d of apparatuses in a second assembled state. The second assembled state may generally comprise apparatuses in the first assembled state combined with a third component. The third component may be of the first type, the second type, or a third type. In the evaporator coil example, the second assembled state may comprise the coil slabs in the "V" shape with the addition of extra metal tubing. The camera 106e may be configured to record video data 110e of apparatuses in a third assembled state. The third assembled state may generally comprise apparatuses in the second assembled state, and wherein a color and/or texture change has occurred on the surface of one or more regions of the apparatuses in the second assembled state. In the evaporator coil example, the third assembled state may comprise the second assembled state wherein the coloring of portions of the second assembled state were altered by the heat of a brazing process. The camera 106f may be configured to record video data 110f of apparatuses in a tested state. The tested state may generally comprise the third assembled state that has been subject to a quality control test or a fully assembled state that has been subject to the quality control test. In the evaporator coil example, the tested state may comprise a fully assembled evaporator coil that has completed a leak test.

The cameras 106 should be generally configured in their respective zones to capture video from an angle that provides a view of the fingerprinted region or regions of the components and/or products. The discussion of FIGS. 2-14 provides details on what is meant by fingerprinted regions. As will be appreciated from that discussion, the positioning of the cameras 106 in relation to the production line 102 as well as in relation to one another will depend on the nature of the production line 102 and the components used therein.

Fingerprinting Server

Fingerprinting server 104 is configured to receive video data 110 from the cameras 106. The fingerprinting server 104 is generally configured to use the video data 110 to generate unique digital fingerprints for components used on the production line 102. The fingerprinting server 104 is further configured to track individual components through a production process on production line 102 using the unique digital fingerprints. An example embodiment of fingerprinting server 104 comprises a processor 124, a network interface 126, and a memory 128.

The processor 124 comprises one or more processors operably coupled to the memory 128. The processor 124 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 124 may be a programmable logic device, a microcontroller, a microprocessor, or any suitable combination of the preceding. The one or more processors are configured to process data and may be implemented in hardware or software. For example, the processor 124 may be 8-bit, 16-bit, 32-bit, 64-bit or of any other suitable architecture. The processor 124 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors 124 are configured to implement various instructions. For example, the one or more processors 124 are configured to execute one or more set of instructions 133 to implement a fingerprinting module 134 and one or more set of instructions 135 to implement a component tracking module 136. In this way, processor 124 may be a special purpose computer designed to implement the functions disclosed herein. In an embodiment, the fingerprinting module 134 and component tracking module 136 are implemented using logic units, FPGAs, ASICs, DSPs, or any other suitable hardware. For example, fingerprinting module 134 may be configured to perform any of the steps of the method 300 described in FIG. 3. The component tracking module 136 may be configured to perform any of the steps of the method 600 described in FIG. 6.

The network interface 126 is configured to enable wired and/or wireless communications. The network interface 126 is configured to communicate data between the fingerprinting server 104 and other devices (e.g., cameras 106), systems, or domains. For example, the network interface 126 may comprise a WIFI interface, a LAN interface, a WAN interface, a modem, a switch, or a router. The processor 124 is configured to send and receive data using the network interface 126. The network interface 126 may be configured to use any suitable type of communication protocol as would be appreciated by one of ordinary skill in the art.

Memory 128 comprises one or more disks, tape drives, or solid-state drives, and may be used as an over-flow data storage device, to store programs when such programs are selected for execution, and to store instructions and data that are read during program execution. The memory 128 may be volatile or non-volatile and may comprise read-only memory (ROM), random-access memory (RAM), ternary content-addressable memory (TCAM), dynamic random-access memory (DRAM), and static random-access memory (SRAM).

The memory 128 is operable to store a corner detection algorithm 130, a binary descriptor algorithm 132, instructions 133 for implementing a fingerprinting module 134, instructions 135 for implementing a component tracking module 136, a plurality of filtering algorithms 138, and a component database 140.

Corner detection algorithm 130 may be one of a variety of algorithms designed to detect corners (i.e., the intersection of two edges in an image) or an interested point (i.e., a point in an image with a well-defined position such as a point of local intensity). Examples include the Harris corner detector, smallest univalue segment assimilating nucleus (SUSAN) detector, and accelerated segment tests (including the features-from-accelerated-segment test (FAST)). Binary descriptor algorithm 132 is a feature matching algorithm such as a scale invariant feature transform (SIFT), speed up robust feature (SURF), binary-robust-independent-elementary-features (BRIEF) point descriptor, and Oriented FAST and Rotated Brief (ORB). The operation of fingerprinting module 134 is discussed in more detail in FIGS. 2-5. The operation of component tracking module 136 is discussed in more detail in FIGS. 2, 6-14. Filtering algorithms 138 are signal processing algorithms that can be used to process images from cameras 106 before performing feature detection steps. For example, the filtering algorithms 138 may be selected from a mean shift algorithm, a Kalman algorithm, a centroid filter algorithm, or any combination thereof.

Component database 140 is generally configured to track components that are used in production line 102 and to associate digital fingerprints between individual components and larger apparatuses in which those components are incorporated. Specifically, the component database 140 may comprise a plurality of fingerprint registers 142 which links together fingerprints generated at different stages of the manufacturing process. For example, the example a fingerprint register 142 comprises fingerprints 144a and 144b that represent digital fingerprints associated with two different evaporator coil slabs. When those two slabs are combined to build the initial "V"-shaped evaporator coil, another fingerprint 146 is generated. The fingerprint register 142 includes an indication linking fingerprints 144 and 146 so that the components may be tracked as more pieces are added to the evaporator coil. At the next phase of the production cycle a fingerprint 148 is generated and linked to the fingerprints 144 and 146 in the fingerprint register 142. Likewise, the fingerprint 150 generated at the ensuing phase of production is associated with the fingerprints 144, 146, and 148 in the fingerprint register 142. Each component will be added to a fingerprint register 142 after a fingerprint is registered. Ultimately, each apparatus produced on production line 102 will have its own fingerprint register 142 that lists each component and the associated digital fingerprints. In some embodiments, the component database will also include a date and time 154 when components and partially or fully constructed apparatuses passed through particular stages of production line 102.

Operational Flow of HVAC Fingerprinting

Figure 2:
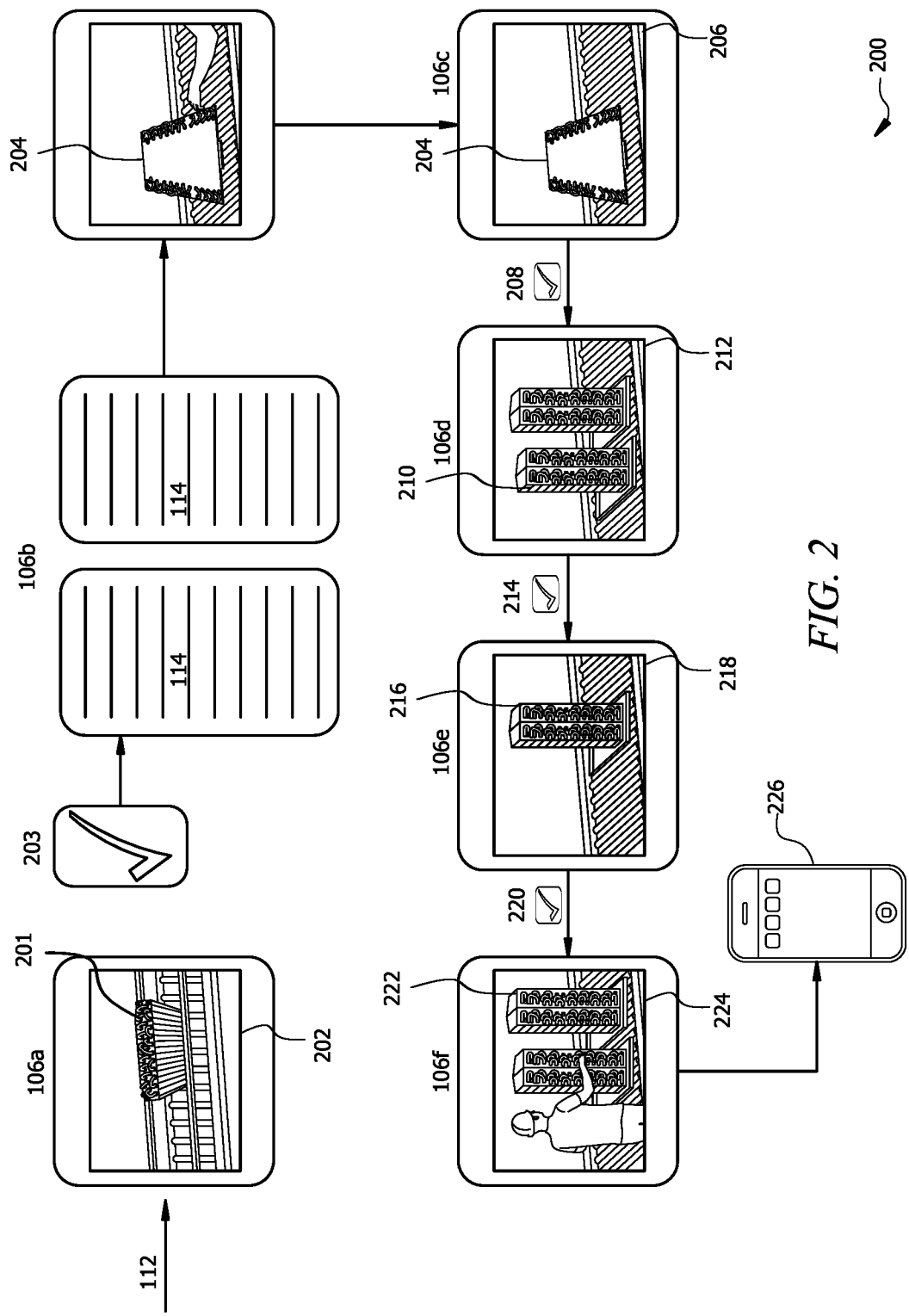
FIG. 2 is an operational flow diagram of an example method for digitally fingerprinting heating, ventilation, and air conditioning (HVAC) coils and tracking coil components through the manufacturing process.
Figure 3:
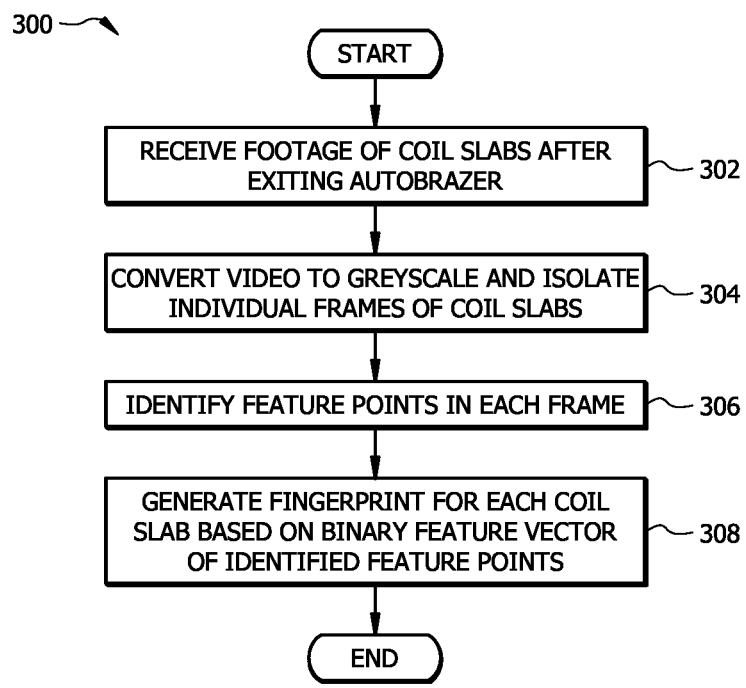
FIG. 3 is a flowchart of an example method for generating digital fingerprints from coil brazing.

FIG. 2 is an operational flow diagram of an example method for digitally fingerprinting heating, ventilation, and air conditioning (HVAC) coils and tracking coil components through the manufacturing process. Both the method 300 described in FIG. 3 and the method 600 described in FIG. 6 may be performed in the operational flow 200 of FIG. 2. The process of generating digital fingerprints for manufactured goods and the method 300 of FIG. 3 are discussed first. FIG. 3 is a flowchart of an example method for generating digital fingerprints from coil brazing. References are made to the operational flow 200 to better illustrate the method 300 described in FIG. 3.

The operational flow 200 picks up after an evaporator coil slab 201 emerges from the automatic brazer 112. The camera 106a is configured to record video 202 of an evaporator coil slab 201—and other similar coil slabs emerging as part of a continuous production process—after it emerges from the automatic brazer 112. The method 300 of FIG. 3 begins here when the camera 106a sends video data 110a to the fingerprinting server 104 at step 302. Then, at step 304, the fingerprinting server 104 converts the video footage (i.e., video 202) from the received video data 110a to greyscale at step 304. Step 304 further comprises isolating still frames from the video data 110 of individual coil slabs 201. For example, step 304 may result in isolating a first frame comprising a first evaporator coil slab and isolating a second frame comprising a second evaporator coil slab. Each frame comprises a view of brazed tube junctions.

Figure 4A:
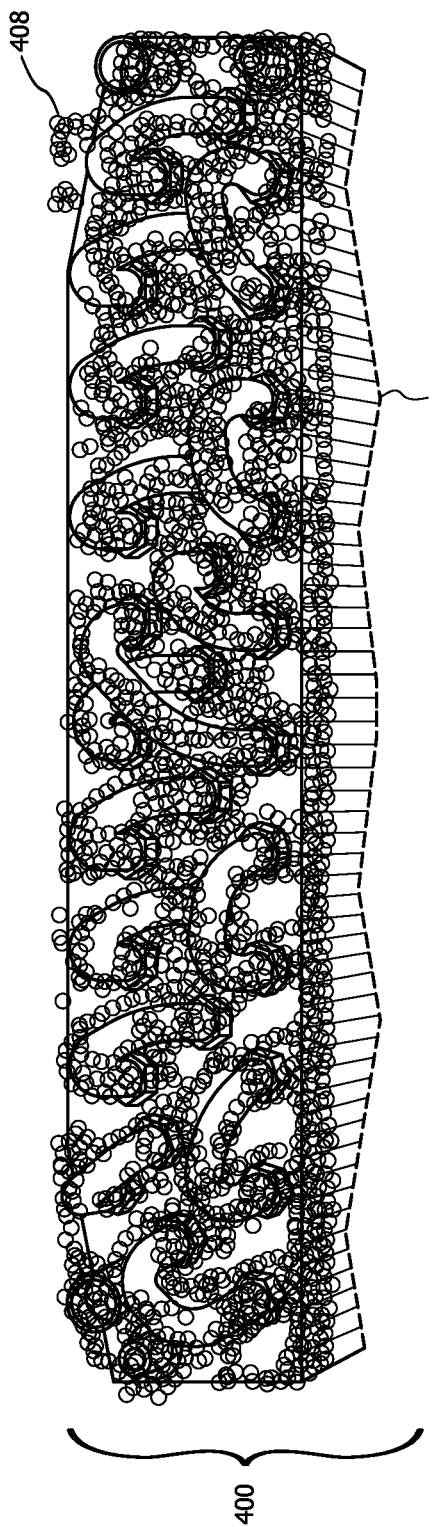
FIG. 4A illustrates feature detection in the fingerprinting process.
Figure 4B:
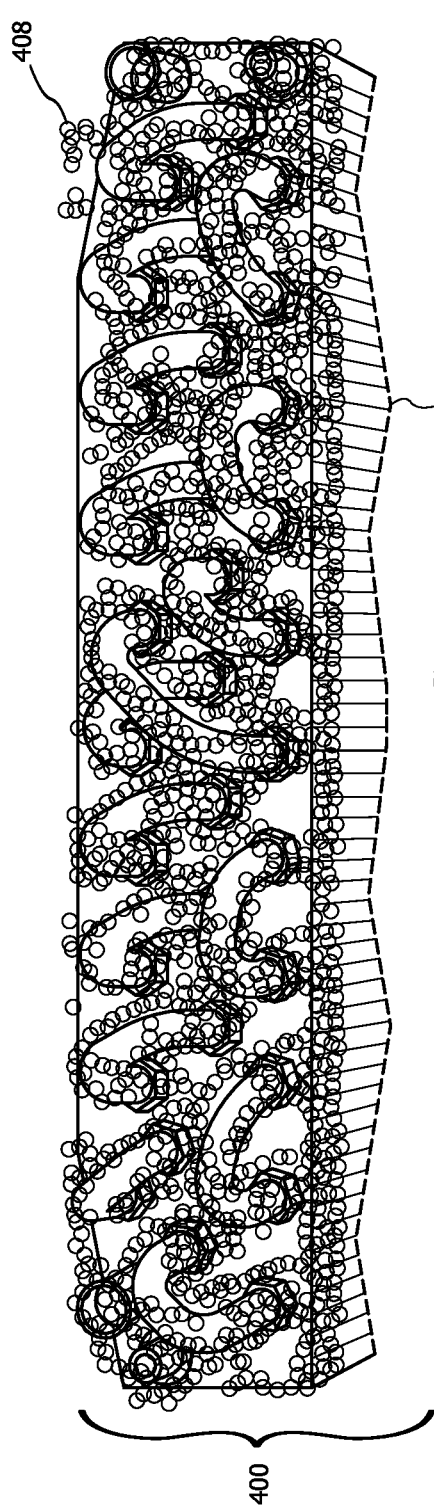
FIG. 4B illustrates feature detection in the fingerprinting process after isolating unique feature points.

The method 300 then proceeds to step 306 where a plurality of feature points are identified in each frame isolated at step 304. Feature points may be edges, including junctions and any set of point having a strong gradient magnitude; corners, broadly encompassing interest points that are not "corners" in the traditional sense; blobs, ridges, etc. For example, some embodiments identify the feature points using a corner detection algorithm 130. FIGS. 4A and 4B illustrate what occurs at step 306. In FIG. 4A, the fingerprinting server 104 has isolated a still frame 400 of an evaporator coil slab 402 (e.g., coil slab 201). Feature points 408 have been identified using FAST (i.e., a corner detection algorithm 130). FIG. 4A illustrates the initial results of applying the FAST algorithm while FIG. 4B, with its lower density of feature points 408, illustrates the elimination of feature points that contribute insufficient uniqueness. The sufficiency of uniqueness may be determined by comparison to a threshold programmed by the user.

Figure 5:
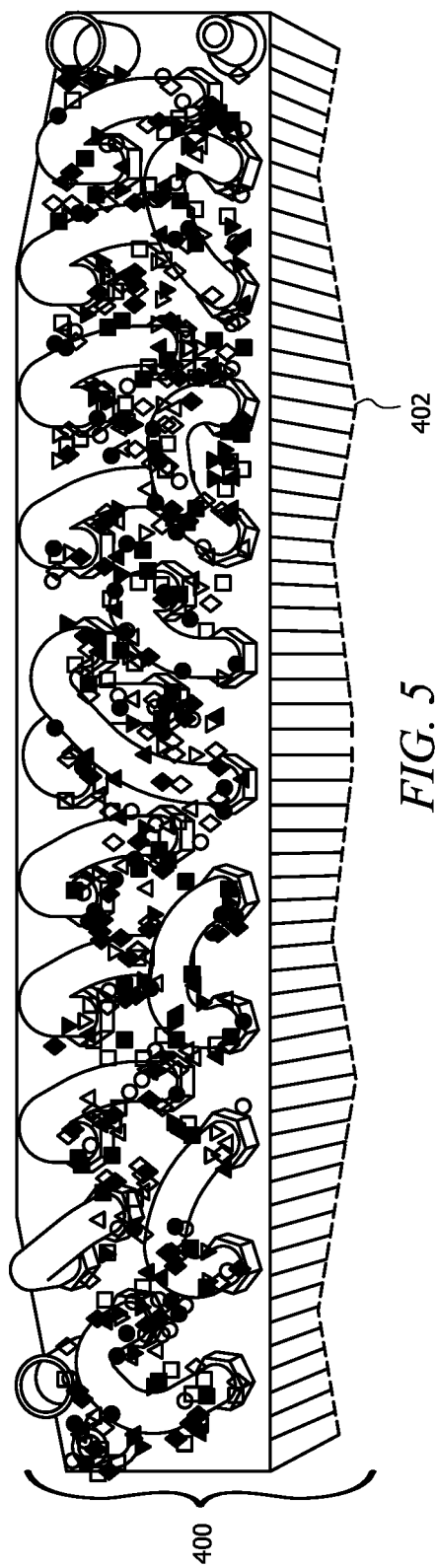
FIG. 5 illustrates the identification of rotationally invariant features using binary descriptors.

Returning to FIG. 3, the method 300 proceeds to step 308 where the fingerprinting server 104 generates a digital fingerprint for each coil slab based on a binary feature vector of feature points 408 identified at the previous step. For example, the fingerprinting server 104 determines that a subset of feature points 408 selected from the plurality of feature points 408 are rotationally invariant. A feature point 408 is considered rotationally invariant if it remains identifiable in images of the slab taken from a different angle. A binary descriptor algorithm (e.g., BRIEF descriptor) is then applied to rotationally invariant subset of feature points 408 to generate a first digital fingerprint comprising a binary feature vector for each point in the first subset of feature points. FIG. 5 provides a visual representation of this step. The squares, diamonds, circles, and triangles represent different types of feature points 408. Shapes that are empty (i.e., not shaded) have a low confidence level for serving as a unique identifier and thus will factor less into the resulting binary feature vectors generated by the application of a binary descriptor like BRIEF. The shaded shapes are feature points 408 with a high confidence level of uniqueness. In this way a digital fingerprint is generated from each image of an evaporator coil slab 201 that proceeds through production line 102.

Returning to the operational flow 200, the digital fingerprint generated at step 308 of method 300 is represented by box 203. The evaporator coil slabs 201 may be stored in a staging area 114 before they are incorporated into a "V" shaped evaporator coil base 204 (i.e., a first assembled state) at coil assembly area 116. The coil base 204 comprises two coil slabs 201. After assembly at coil assembly area 116, the camera 106c captures video 206 of the coil base 204. Fingerprinting server 104 receives the video 206 as video data 110c. It then converts the video footage 206 to greyscale. The fingerprinting server 104 then isolates, from the greyscale video footage 206, an image of the coil base 204. The fingerprinting server 104 then determines that a first coil slab 201 in the evaporator coil base 204 is associated with a first digital fingerprint 203 and that a second coil slab 201 in the evaporator coil base 204 is associated with a second digital fingerprint 203. The fingerprinting server 104 is further configured to generate a fingerprint 208 comprising the first and second fingerprints 203.

Next, the coil bases 204 receive additional fittings (e.g., additional metal tubing on the exterior of one or both coil slabs 201) to create a second assembled state 210. The camera 106d records video 212 of the apparatuses in the second assembled state 210. Fingerprinting server 104 receives the video 212 as video data 110d. It then converts the video footage 212 to greyscale. The fingerprinting server 104 then isolates, from the greyscale video footage 212, an image of the second assembled state 210. The fingerprinting server 104 then identifies a plurality of feature points in the image of the second assembled state 210. It then determines that a subset of feature points selected from the plurality of feature points identified in the image of the second assembled state 210 are rotationally invariant. The fingerprinting server 104 then applies the binary descriptor algorithm (e.g., BRIEF) to the subset of feature points selected from the plurality of feature points identified in the image of the second assembled state 210 to generate a fingerprint 214. The fingerprint 214 comprises a binary feature vector for each point in the subset of feature points selected from the plurality of feature points identified in the image of the second assembled state 210.

The fingerprinting server 104 may also determine that the coil base 204 that is in the second assembled state 210 is associated with a digital fingerprint 208. The fingerprinting server 104 then updates a fingerprint register 142 in the component database 140 to link the digital fingerprint 214 with the digital fingerprint 208.

The apparatuses in the second assembled state 210 may then go through a manual brazing process in a manual brazing area 120. After brazing is complete, the camera 106e may record video 218 of the apparatuses in a third assembled state 216. The third assembled state 216 comprises the second assembled state 210 wherein the additional tubing has been brazed. The camera 106e records video 218 of the apparatuses in the third assembled state 216. Fingerprinting server 104 receives the video 218 as video data 110e. It then converts the video footage 218 to greyscale. The fingerprinting server 104 then isolates, from the greyscale video footage 218, an image of the third assembled state 216. The fingerprinting server 104 then identifies a plurality of feature points in the image of the third assembled state 216. It then determines that a subset of feature points selected form the plurality of feature points identified in the image of the third assembled state 216 are rotationally invariant. The fingerprinting server 104 then applies the binary descriptor algorithm (e.g., BRIEF) to the subset of feature points selected from the plurality of feature points identified in the image of the third assembled state 216 to generate a fingerprint 220. The fingerprint 200 comprises a binary feature vector for each point in the subset of feature points selected from the plurality of feature points identified in the image of the image of the third assembled state 216.

The fingerprinting server 104 may also determine that the apparatus in the third assembled state is associated with fingerprint 208 and/or fingerprint 214. The fingerprinting server 104 then updates a fingerprint register 142 in the component database 140 to link the digital fingerprint 220 with fingerprint 203, fingerprint 208, and fingerprint 214.

Once the evaporator coil is completed, the coil is subjected to one or more quality control tests in the leak test area 122. As will be explained in FIG. 6, the digital fingerprints 203, 208, 214, and 220 can be used to identify batches of defective components when it is determined that a quality control test performed in leak test area 122 if failed.

Component Tracking Using Digital Fingerprints

Figure 6:
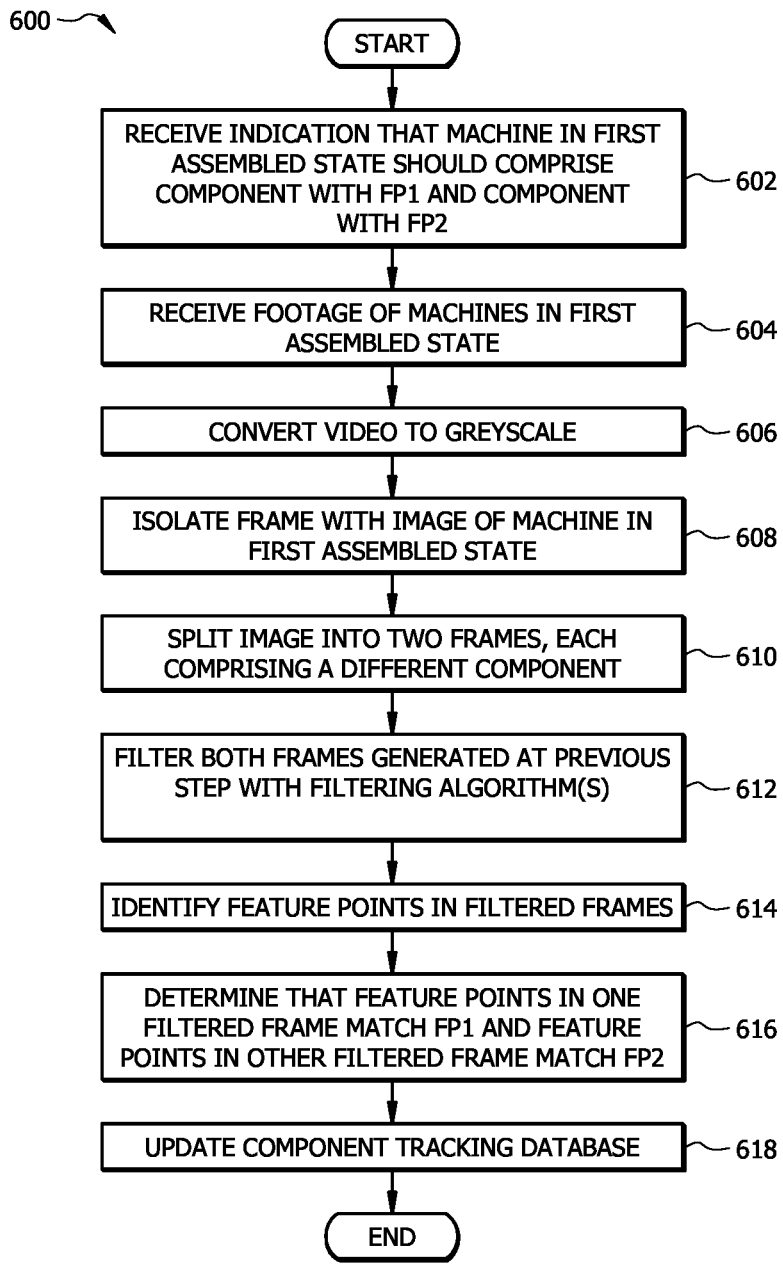
FIG. 6 is a flowchart of an example method for tracking components in an automated production of evaporator coils.

The method 600 described in FIG. 6 may be performed in the operational flow of FIG. 2. FIG. 6 is a flowchart of an example method for tracking components in an automated production of evaporator coils. The method 600 picks up in operational flow 200 after the evaporator coil base 204 is assembled. At step 602 of the method 600, the fingerprinting server 104 receives an indication that an apparatus in the first assembled state (e.g., evaporator coil base 204) should comprise a component (e.g., a coil slab 201) with a first digital fingerprint (i.e., a first fingerprint 203) and a component (e.g., a second coil slab 201) with a second digital fingerprint (i.e., a second fingerprint 203). The fingerprinting server 104 then receives video footage 206 of the evaporator coil base 204 from camera 106c at step 604. At step 604, the fingerprinting server 104 converts the video footage 206 to greyscale.

The fingerprinting server 104 then proceeds to step 608 where it isolates, from the greyscale video footage 206, a first frame comprising an image of an apparatus in the first assembled state (i.e., an evaporator coil base 204). At step 610 this frame is split into a second frame comprising the first component of the first type, and a third frame comprising the second component (which is either of the first type or of the second type). For example, the second frame may comprise a first coil slab 201 and third frame may comprise a second coil slab 201. The fingerprinting server 104 then applies one or more filtering algorithms 138 to the second and third frames to generate a first and second filtered image at step 612. In one embodiment, the filtering algorithm 138 is selected from a mean shift algorithm, a centroid filter, and a Kalman filter. At step 614 the fingerprinting server 104 generates a first set of feature points from the first filtered image and a second set of feature points from the second filtered image. Feature detection occurs using the corner detection algorithm 130 and binary descriptor algorithm 132 as described above for the digital fingerprint generation.

The fingerprinting server 104 then determines at step 616 that the first set of feature points from the first filtered image matches the feature points comprising the first digital fingerprint (i.e., the first fingerprint 203). This step may comprise identifying feature points or groups of feature points in the first set of feature points from the first filtered image that have some similarity to feature points or groups of feature points in the first digital fingerprint; assigning a confidence interval to each of the identified feature points or groups of feature points having some similarity; calculating a correlation value, comprising the number of sets of similar points or groups of points whose confidence interval exceeds a first threshold; and determining that the correlation value exceeds a second threshold. This process is generically illustrated using FIGS. 7 and 8. FIG. 7 illustrates the comparison of a first digital fingerprint 702 to a coil slab image 704 that does not match. Each of the lines 706 represents a match between a feature point in the digital fingerprint 702 and the image 704. Matches of a high confidence are solid and low-confidence matches are dashed or dotted lines. As illustrated in FIG. 7, the lines are low density, and mostly of low confidence. This indicates that the fingerprint 702 is not a match to the coil slab in the image 704. In contrast, the FIG. 8 illustrates the comparison of the first digital fingerprint 702 to a coil slab image 802 that matches. The lines between feature points are high density, and the matches are mainly high confidence (i.e., solid lines). This indicates that the fingerprint 702 is a match to the coil slab in the image 802.

Figure 9:
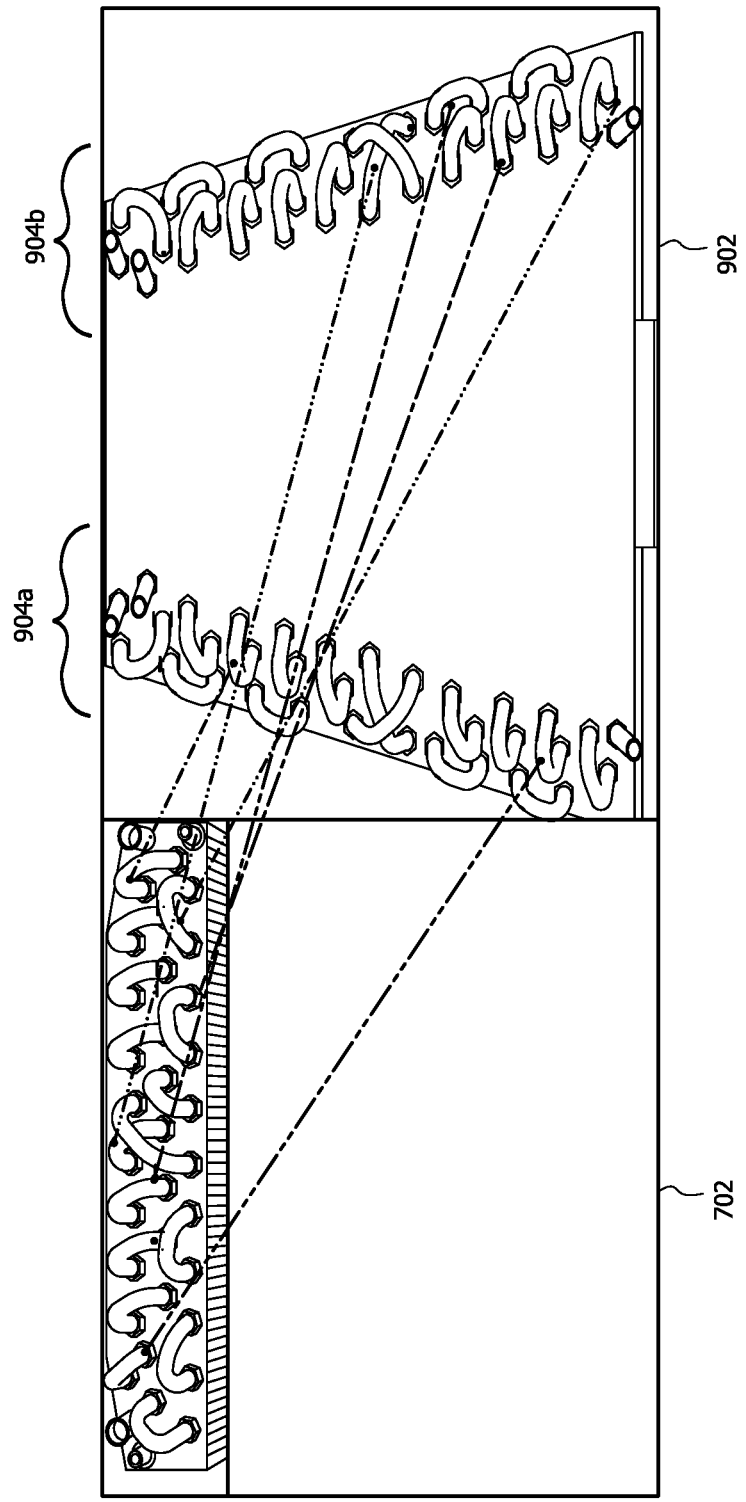
FIG. 9 illustrates the comparison of the first digital fingerprint to an evaporator coil image that does not contain a matching slab.
Figure 10:
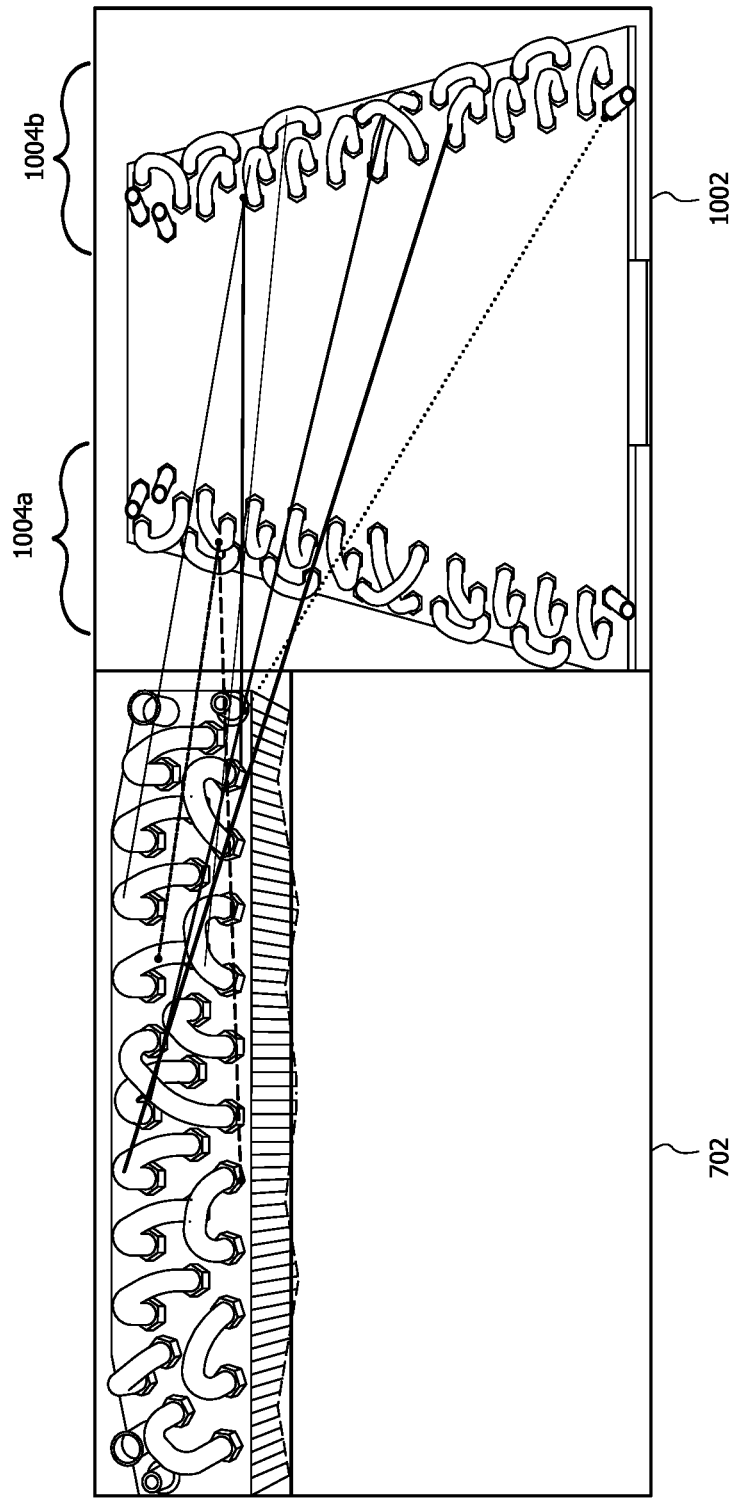
FIG. 10 illustrates the comparison of the first digital fingerprint to an evaporator coil image that contains a matching slab.

While FIGS. 7 and 8 generally illustrate the fingerprint matching process, FIGS. 9 and 10 illustrate how this is done when dealing with an evaporator coil base 204 rather than individual evaporator coil slabs 201. FIG. 9 illustrates the comparison of the first digital fingerprint 702 to an evaporator coil image 902 that does not contain a matching slab 904a or 904b, and FIG. 10 illustrates the comparison of the first digital fingerprint 702 to an evaporator coil image 1002 that contains a matching slab 1004b.

Returning to FIG. 6, step 616 further comprises determining that the second set of feature points from the second filtered image matches the feature points comprising the second digital fingerprint (i.e., the second fingerprint 203). This step may comprise identifying feature points or groups of feature points in the second set of feature points from the second filtered image that have some similarity to feature points or groups of feature points in the second digital fingerprint; assigning a confidence interval to each of the identified feature points or groups of feature points having some similarity; calculating a correlation value, comprising the number of sets of similar points or groups of points whose confidence interval exceeds a first threshold; and determining that the correlation value exceeds a second threshold. The is the same process as just explained for the first set of feature points.

Finally, method 600 proceeds to step 618 where the fingerprinting server 104 updates a component database 140 with a third digital fingerprint (e.g., fingerprint 208 stored in the memory 128 as fingerprint 146) based on the apparatus in the first assembled state, a date and time 154 when the apparatus in the first assembled state was assembled, and an indication (e.g., in fingerprint register 142) that the apparatus in the first assembled state is associated with the first (i.e., the first fingerprint 203) and second (i.e., the second fingerprint 203) digital fingerprints.

Figure 11:
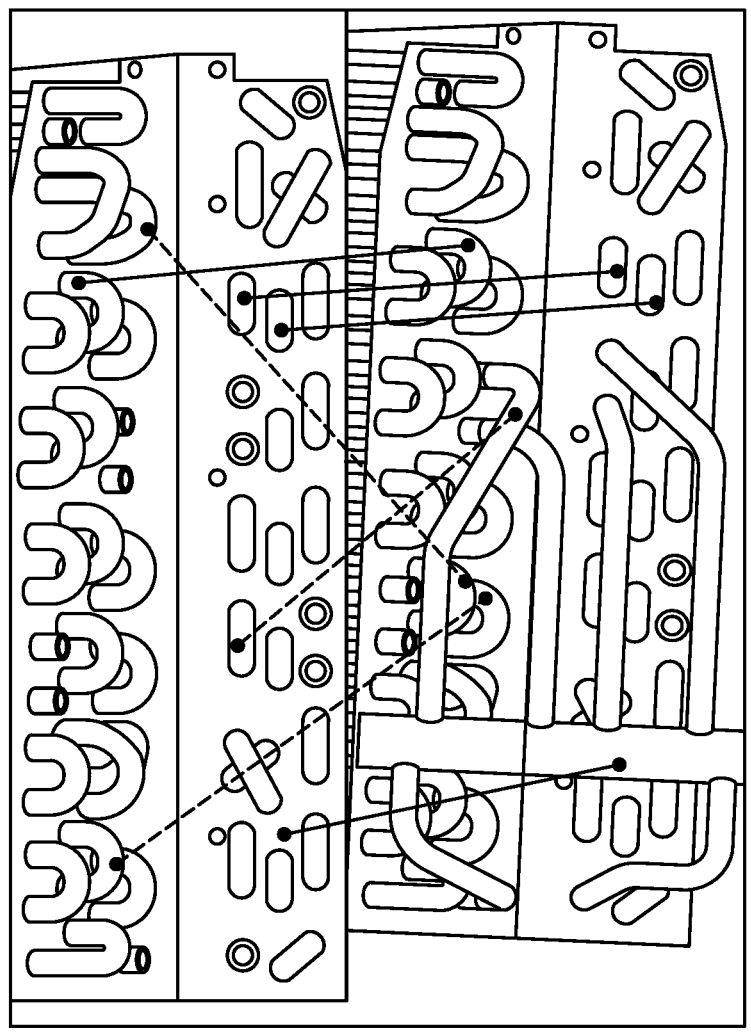
FIG. 11 illustrates the comparison of a second digital fingerprint to an evaporator coil image that does not match.
Figure 12:
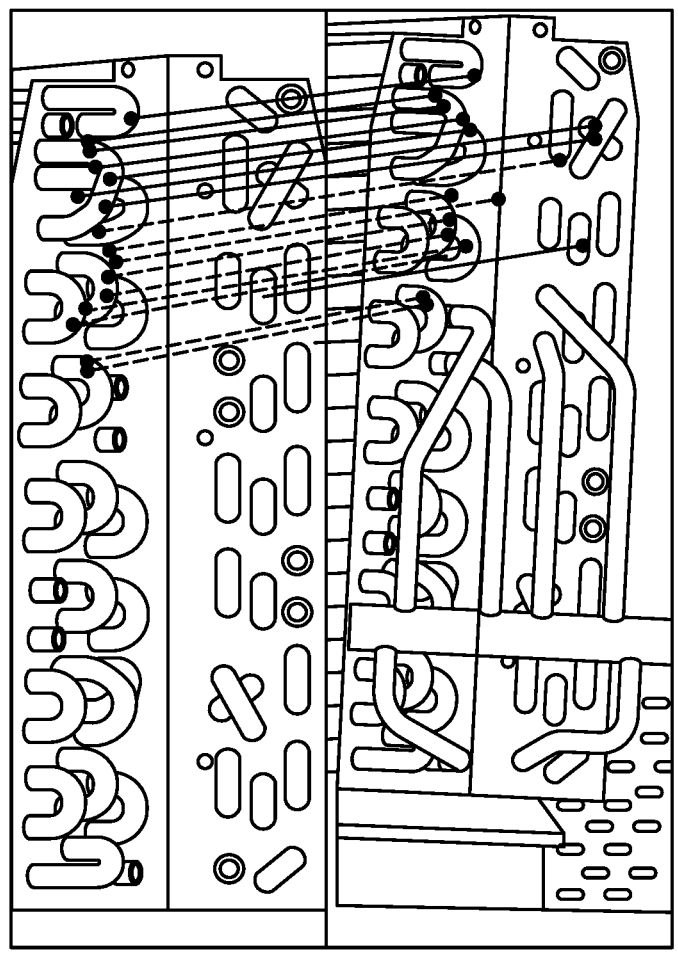
FIG. 12 illustrates the comparison of the second digital fingerprint to an evaporator coil image that matches.
Figure 13:
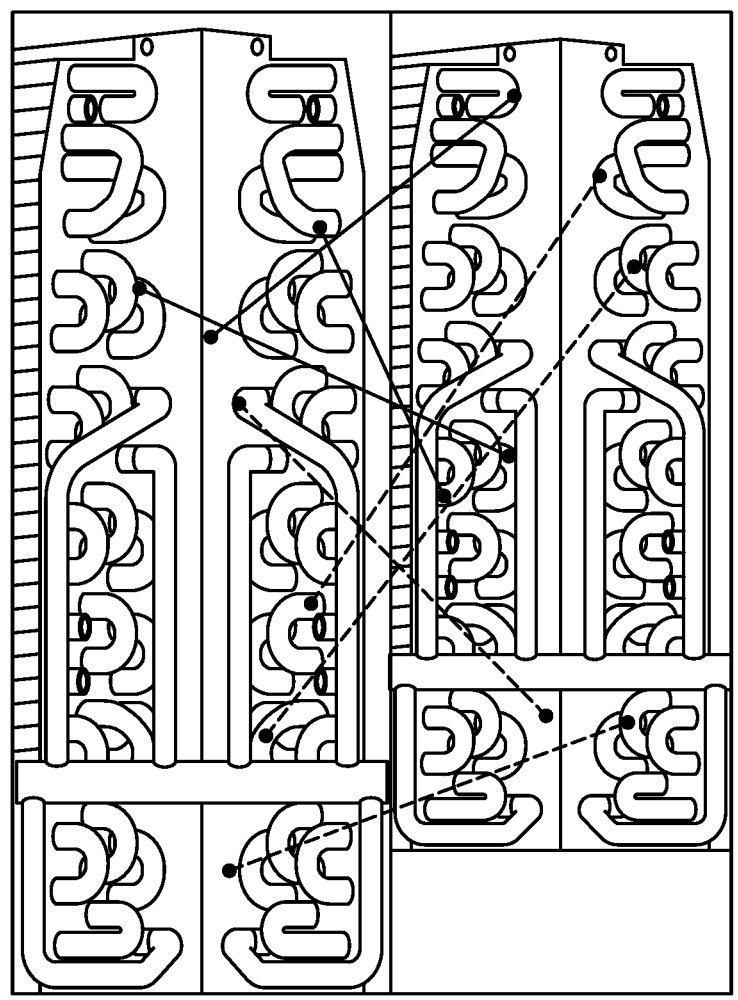
FIG. 13 illustrates the comparison of a third digital fingerprint to an evaporator coil image that does not match.
Figure 14:
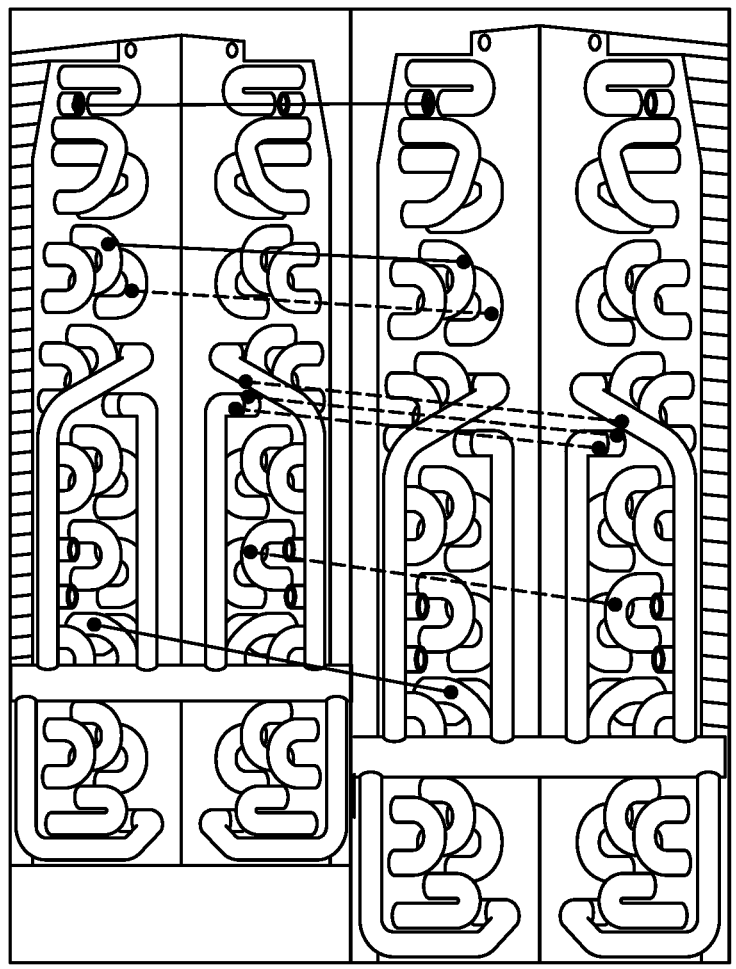
FIG. 14 illustrates the comparison of the third digital fingerprint to an evaporator coil image that matches.

The fingerprint analysis occurs again each time the apparatus (e.g., coil base 204) is further modified. Such matching operations are illustrated in FIGS. 11-14. FIG. 11 illustrates the comparison of a second digital fingerprint 1102 to an evaporator coil image 1104 that does not match, as evidenced by the small number of feature point matches and the low confidence of the matches as shown by the prevalence of dashed rather than solid lines. FIG. 12 illustrates the comparison of the second digital fingerprint 1102 to an evaporator coil image 1202 that matches. In contrast to FIG. 11, this is a match based on the numerous solid lines indicating a high confidence in the feature point match determinations. FIG. 13 illustrates the comparison of a third digital fingerprint 1302 to an evaporator coil image 1304 that does not match, as evidenced by the small number of feature point matches and the low confidence of the matches as shown by the prevalence of dashed rather than solid lines. FIG. 14 illustrates the comparison of the third digital fingerprint 1302 to an evaporator coil image 1402 that matches. In contrast to FIG. 3, this match is based on multiple solid lines and only a few dashed lines.

Specifically, when the coil base 204 receives additional tubing and fittings, creating a second assembled state 210, the fingerprinting server 104 will receive an indication that an apparatus in the second assembled state should comprise an apparatus in the first assembled state 204 with the third digital fingerprint (i.e., fingerprint 208). The fingerprinting server 104 will then receive video footage 212 from the camera 106*d*. It then converts the video footage 212 to greyscale. The fingerprinting server 104 then isolates a fourth frame comprising an image of an apparatus in the second assembled state 210 from the greyscale video footage 212. At least one filtering algorithm 138 is applied to the fourth frame to generate a third filtered image. The fingerprinting server 104 then generates a third set of feature points from the fourth filtered image. The fingerprinting server 104 is then configured to determine that the third set of feature points from the fourth filtered image matches feature points comprising the third digital fingerprint (i.e., the fingerprint 208). This step may comprise identifying feature points or groups of feature points in the third set of feature points from the fourth filtered image that have some similarity to feature points or groups of feature points in the third digital fingerprint; assigning a second confidence interval to each of the identified feature points or groups of feature points having some similarity; calculating a second correlation value, comprising the number of sets of similar points or groups of points whose confidence interval exceeds the first threshold; and determining that the second correlation value exceeds the second threshold. This is the same process as described for the other feature comparison steps.

Finally, the fingerprinting server 104 updates the component database 140 with a fourth digital fingerprint (e.g., fingerprint 214 stored in the memory 128 as fingerprint 148) based on the apparatus in the second assembled state, a date and time 154 when the apparatus in the second assembled state was assembled, an indication (e.g., in fingerprint register 142) that the apparatus in the second assembled state is associated with the first (i.e., the first fingerprint 203), second (i.e., the second fingerprint 203), and/or third (i.e., fingerprint 208) digital fingerprints.

The fingerprinting server 104 may further receive an indication that an apparatus in the third assembled state 216 should comprise an apparatus in the second assembled state 210 with the fourth digital fingerprint (i.e., fingerprint 214). For example, the tubing added to create the second assembled state 210 may be brazed, creating a third assembled state 216. The fingerprinting server 104 may receive video footage 218 from camera 106*e* of the apparatus in the third assembled state 216. The fingerprinting server 104 then converts the video footage 218 to greyscale. It then isolates a fifth frame comprising an image of an apparatus in the third assembled state 216 from the greyscale video 218. At least one filtering algorithm 138 is applied to the fifth frame to generate a fifth filtered image. The fingerprinting server 104 then generates a fourth set of feature points from the fifth filtered image. The fingerprinting server 104 is then configured to determine that the fourth set of feature points from the fifth filtered image matches the feature points comprising the fourth digital fingerprint (i.e., the fingerprint 214). This step may comprise identifying feature points or groups of feature points in the fourth set of feature points from the fifth filtered image that have some similarity to feature points or groups of feature points in the fourth digital fingerprint; assigning a third confidence interval to each of the identified feature points or groups of feature points having some similarity; calculating a third correlation value, comprising the number of sets of similar points or groups of points whose confidence interval exceeds the first threshold; and determining that the third correlation value exceeds the second threshold.

Finally, the fingerprinting server 104 update the component database 140 with a fifth digital fingerprint (e.g., fingerprint 220 stored in the memory 128 as fingerprint 150) based on the apparatus in the third assembled state, a date and time 154 when the apparatus in the third assembled state was assembled, an indication (e.g., in fingerprint register 142) that the apparatus in the second assembled state is associated with the first (i.e., the first fingerprint 203), second (i.e., the second fingerprint 203), third (i.e., fingerprint 208), and/or fourth (i.e., fingerprint 214) digital fingerprints.

The fingerprinting server 104 may further receive an indication that an apparatus in a tested state 222 should comprise an apparatus in the third assembled state 216 with the fifth digital fingerprint 220. The fingerprinting server 104 may receive video footage 224 from the camera 106*f*. The fingerprinting server 104 converts the video footage 224 to greyscale. It then isolates a sixth frame comprising an image of an apparatus in the tested state 222 from the greyscale video 224. At least one filtering algorithm 138 is applied to the sixth frame to generate a sixth filtered image. The fingerprinting server 104 then generates a fifth set of feature points from the sixth filtered image. The fingerprinting server 104 is then configured to determine that the fifth set of feature points from the sixth filtered image matches the feature points comprising the fifth digital fingerprint (i.e., the fingerprint 220). This step may comprise identifying feature points or groups of feature points in the fifth set of feature points from the sixth filtered image that have some similarity to feature points or groups of feature points in the fifth digital fingerprint; assigning a fourth confidence interval to each of the identified feature points or groups of feature points having some similarity; calculating a fourth correlation value, comprising the number of sets of similar points or groups of points whose confidence interval exceeds the first threshold; and determining that the fourth correlation value exceeds the second threshold.

The fingerprinting server 104 is further configured to determine that that the apparatus in the tested state 222 did not pass the quality control test. For example, a completed and tested HVAC evaporator coil may exhibit leaking at a brazing site. The fingerprinting server 104 then determines the dates and times when the apparatus in the tested state 222 was assembled in the first assembled state 204, assembled in the second assembled state 210; and/or assembled in the third assembled state 216. Finally, the fingerprinting server 104 may identify the other apparatuses manufactured within a time window comprising the dates and times when the apparatus was assembled in the first assembled state 204, assembled in the second assembled state 210, and/or assembled in the third assembled state 216.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for tracking components in an automated manufacturing line, comprising:
    a camera configured to record video of apparatuses in a first assembled state, wherein the first assembled state comprises:
        a first component of a first type, having a first digital fingerprint comprising a first binary feature vector of a plurality of feature points, comprising at least one selected from an edge, a corner, a blob, or a ridge; and
        a second component, being one of the first type or a second type, having a second digital fingerprint comprising a second binary feature vector of a second plurality of feature points that are different from those of the first fingerprint, the second plurality of feature points comprising at least one selected from an edge, a corner, a blob, or a ridge; and
    a component tracking tool comprising:
        a hardware processor communicatively configured to:
            receive an indication that an apparatus in the first assembled state should comprise a component with the first digital fingerprint and a component with the second digital fingerprint;
            receive video footage from the camera;
            isolate a first frame comprising an image of an apparatus in the first assembled state;
            split the first frame into a second frame comprising the first component of the first type and associated with the first digital fingerprint, and a third frame comprising the second component associated with the second digital fingerprint;
            generate a first set of feature points and a second set of feature points comprising at least one selected from an edge, a corner, a blob, or a ridge;
            determine that the first set of feature points matches the feature points comprising the first digital fingerprint;
            determine that the second set of feature points matches the feature points comprising the second digital fingerprint;
            generate a third digital fingerprint based on the apparatus in the first assembled state, wherein the third digital fingerprint comprises the first digital fingerprint and the second digital fingerprint; and
            update a component database with:
                the third digital fingerprint;
                a date and time when the apparatus in the first assembled state was assembled; and
                an indication that the apparatus in the first assembled state is associated with the first and second digital fingerprints.

2. The system of claim 1, further comprising:
    a second camera configured to record video of apparatuses in a second assembled state, wherein the second assembled state comprises the apparatuses in the first assembled state combined with a third component, the third component being one of the first type, the second type, or a third type; and
    wherein the hardware processor is further configured to:
        receive an indication that an apparatus in the second assembled state should comprise an apparatus in the first assembled state with the third digital fingerprint;
        receive video footage from the second camera;
        isolate a fourth frame comprising an image of an apparatus in the second assembled state;
        generate a third set of feature points comprising at least one selected from an edge, a corner, a blob, or a ridge;
        determine that the third set of feature points matches feature points comprising the third digital fingerprint;
        update the component database with:
            a fourth digital fingerprint based on the apparatus in the second assembled state;
            a date and time when the apparatus in the second assembled state was assembled; and
            an indication that the apparatus in the second assembled state is associated with the first, second, and/or third digital fingerprints.

3. The system of claim 2, further comprising:
    a third camera configured to record video of apparatuses in a third assembled state, wherein the third assembled state comprises the apparatuses in the second assembled state, and wherein a color and/or texture change has occurred on the surface of one or more regions of the apparatuses in the second assembled state; and
    wherein the hardware processor is further configured to:
        receive an indication that an apparatus in the third assembled state should comprise an apparatus in the second assembled state with the fourth digital fingerprint;
        receive video footage from the third camera;
        isolate a fifth frame comprising an image of an apparatus in the third assembled state;

generate a fourth set of feature points comprising at
least one selected from an edge, a corner, a blob, or
a ridge;
determine that the fourth set of feature points matches
the feature points comprising the fourth digital fingerprint;
update the component database with:
a fifth digital fingerprint based on the apparatus in
the third assembled state;
a date and time when the apparatus in the third
assembled state was assembled; and
an indication that the apparatus in the second
assembled state is associated with the first, second,
third, and/or fourth digital fingerprints.

4. The system of claim 3, further comprising:
a fourth camera configured to record video of apparatuses
in a tested state, wherein the tested state comprises the
third assembled state that has been subject to a quality
control test or a fully assembled state that has been
subject to the quality control test; and
wherein the hardware processor is further configured to:
receive an indication that an apparatus in the tested
state should comprise an apparatus in the third
assembled state with the fifth digital fingerprint;
receive video footage from the fourth camera;
isolate a sixth frame comprising an image of an apparatus in the tested state;
generate a fifth set of feature points comprising at least
one selected from an edge, a corner, a blob, or a
ridge;
determine that the fifth set of feature points matches the
feature points comprising the fifth digital fingerprint;
determine that the apparatus in the tested state did not
pass the quality control test;
determine the dates and times when the apparatus was
assembled in the first assembled state, assembled in
the second assembled state; and/or assembled in the
third assembled state; and
identify the other apparatuses manufactured within a
time window comprising the dates and times when
the apparatus was assembled in the first assembled
state, assembled in the second assembled state, and/
or assembled in the third assembled state.

5. The system of claim 1, wherein determining that the
first set of feature points matches the feature points comprising the first digital fingerprint comprises:
identify feature points or groups of feature points in the
first set of feature points from the first filtered image
that have some similarity to feature points or groups of
feature points in the first digital fingerprint;
assign a confidence interval to each of the identified
feature points or groups of feature points having some
similarity;
calculate a correlation value, comprising the number of
sets of similar points or groups of points whose confidence interval exceeds a first threshold; and
determine that the correlation value exceeds a second
threshold.

6. The system of claim 4, wherein:
determine that the third set of feature points matches
feature points comprising the third digital fingerprint
comprises:
identify feature points or groups of feature points in the
third set of feature points that have some similarity
to feature points or groups of feature points in the
third digital fingerprint;
assign a second confidence interval to each of the
identified feature points or groups of feature points
having some similarity;
calculate a second correlation value, comprising the
number of sets of similar points or groups of points
whose confidence interval exceeds the first threshold;
determine that the second correlation value exceeds the
second threshold;
determine that the fourth set of feature points matches the
feature points comprising the fourth digital fingerprint
comprises:
identify feature points or groups of feature points in the
fourth set of feature points that have some similarity
to feature points or groups of feature points in the
fourth digital fingerprint;
assign a third confidence interval to each of the identified feature points or groups of feature points
having some similarity;
calculate a third correlation value, comprising the number of sets of similar points or groups of points
whose confidence interval exceeds the first threshold;
determine that the third correlation value exceeds the
second threshold; and
determine that the fifth set of feature points matches the
feature points comprising the fifth digital fingerprint
comprises:
identify feature points or groups of feature points in the
fifth set of feature points that have some similarity to
feature points or groups of feature points in the fifth
digital fingerprint;
assign a fourth confidence interval to each of the
identified feature points or groups of feature points
having some similarity;
calculate a fourth correlation value, comprising the
number of sets of similar points or groups of points
whose confidence interval exceeds the first threshold; and
determine that the fourth correlation value exceeds the
second threshold.

7. A method for tracking components in an automated
manufacturing line, comprising:
receiving an indication that an apparatus in a first
assembled state should comprise a first component with
a first digital fingerprint comprising a first binary
feature vector of a plurality of feature points, and a
second component with a second digital fingerprint
comprising a second binary feature vector of a plurality
of feature points that are different from those of the first
fingerprint, the feature points in the first and second
fingerprints comprising at least one selected from an
edge, a corner, a blob, or a ridge;
receiving video footage from a camera configured to
record video of apparatuses in the first assembled state,
wherein the first assembled state comprises;
a first component of a first type; and
a second component, being one of the first type or a
second type;
isolating a first frame comprising an image of an apparatus in the first assembled state;
splitting the first frame into a second frame comprising
the first component of the first type and associated with
the first digital fingerprint, and a third frame comprising the second component associated with the second
digital fingerprint;

generating a first set of feature points and a second set of feature points the first and second sets of feature points each comprising at least one selected from an edge, a corner, a blob, or a ridge;

determining that the first set of feature points matches the feature points comprising the first digital fingerprint;

determining that the second set of feature points matches the feature points comprising the second digital fingerprint;

generating a third digital fingerprint based on the apparatus in the first assembled state, wherein the third digital fingerprint comprises the first digital fingerprint and the second digital fingerprint; and updating a component database with:
  the third digital fingerprint;
  a date and time when the apparatus in the first assembled state was assembled; and
  an indication that the apparatus in the first assembled state is associated with the first and second digital fingerprints.

8. The method of claim 7, further comprising:

receiving an indication that an apparatus in a second assembled state should comprise an apparatus in the first assembled state with the third digital fingerprint;

receiving video footage from a second camera configured to record video of apparatuses in the second assembled state, wherein the second assembled state comprises the apparatuses in the first assembled state combined with a third component, the third component being one of the first type, the second type, or a third type;

isolating a fourth frame comprising an image of an apparatus in the second assembled state;

generating a third set of feature points comprising at least one selected from an edge, a corner, a blob, or a ridge;

determining that the third set of feature points matches feature points comprising the third digital fingerprint;

updating the component database with:
  a fourth digital fingerprint based on the apparatus in the second assembled state;
  a date and time when the apparatus in the second assembled state was assembled; and
  an indication that the apparatus in the second assembled state is associated with the first, second, and/or third digital fingerprints.

9. The method of claim 8, further comprising:

receiving an indication that an apparatus in a third assembled state should comprise an apparatus in the second assembled state with the fourth digital fingerprint;

receiving video footage from a third camera configured to record video of apparatuses in the third assembled state, wherein the third assembled state comprises the apparatuses in the second assembled state, and wherein a color and/or texture change has occurred on the surface of one or more regions of the apparatuses in the second assembled state;

isolating a fifth frame comprising an image of an apparatus in the third assembled state;

generating a fourth set of feature points from the fifth filtered image, comprising at least one selected from an edge, a corner, a blob, or a ridge;

determining that the fourth set of feature points matches the feature points comprising the fourth digital fingerprint;

updating the component database with:
  a fifth digital fingerprint based on the apparatus in the third assembled state;
  a date and time when the apparatus in the third assembled state was assembled; and
  an indication that the apparatus in the second assembled state is associated with the first, second, third, and/or fourth digital fingerprints.

10. The method of claim 9, further comprising:

receiving an indication that an apparatus in a tested state should comprise an apparatus in the third assembled state with the fifth digital fingerprint;

receiving video footage from a fourth camera configured to record video of apparatuses in the tested state, wherein the tested state comprises the third assembled state that has been subject to a quality control test or a fully assembled state that has been subject to the quality control test;

isolating a sixth frame comprising an image of an apparatus in the tested state;

generating a fifth set of feature points comprising at least one selected from an edge, a corner, a blob, or a ridge;

determining that the fifth set of feature points matches the feature points comprising the fifth digital fingerprint;

determining that the apparatus in the tested state did not pass the quality control test;

determining the dates and times when the apparatus was assembled in the first assembled state, assembled in the second assembled state; and/or assembled in the third assembled state; and identifying the other apparatuses manufactured within a time window comprising the dates and times when the apparatus was assembled in the first assembled state, assembled in the second assembled state, and/or assembled in the third assembled state.

11. The method of claim 7, wherein determining that the first set of feature points matches the feature points comprising the first digital fingerprint:

identifying feature points or groups of feature points in the first set of feature points from the first filtered image that have some similarity to feature points or groups of feature points in the first digital fingerprint;

assigning a confidence interval to each of the identified feature points or groups of feature points having some similarity;

calculating a correlation value, comprising the number of sets of similar points or groups of points whose confidence interval exceeds a first threshold; and determining that the correlation value exceeds a second threshold.

12. The method of claim 10, wherein:

determining that the third set of feature points matches feature points comprising the third digital fingerprint comprises:
  identifying feature points or groups of feature points in the third set of feature points that have some similarity to feature points or groups of feature points in the third digital fingerprint;
  assigning a second confidence interval to each of the identified feature points or groups of feature points having some similarity;
  calculating a second correlation value, comprising the number of sets of similar points or groups of points whose confidence interval exceeds the first threshold;
  determining that the second correlation value exceeds the second threshold;

determining that the fourth set of feature points matches the feature points comprising the fourth digital fingerprint comprises:

identifying feature points or groups of feature points in the fourth set of feature points that have some similarity to feature points or groups of feature points in the fourth digital fingerprint;
assigning a third confidence interval to each of the identified feature points or groups of feature points having some similarity;
calculating a third correlation value, comprising the number of sets of similar points or groups of points whose confidence interval exceeds the first threshold;
determining that the third correlation value exceeds the second threshold; and
determining that the fifth set of feature points matches the feature points comprising the fifth digital fingerprint comprises:
identifying feature points or groups of feature points in the fifth set of feature points that have some similarity to feature points or groups of feature points in the fifth digital fingerprint;
assigning a fourth confidence interval to each of the identified feature points or groups of feature points having some similarity;
calculating a fourth correlation value, comprising the number of sets of similar points or groups of points whose confidence interval exceeds the first threshold; and
determining that the fourth correlation value exceeds the second threshold.

13. A non-transitory computer-readable medium storing instructions that, when executed by a hardware processor, cause the hardware processor to:
receive an indication that an apparatus in a first assembled state should comprise a first component with a first digital fingerprint comprising a first binary feature vector of a plurality of feature points, and a second component with a second digital fingerprint comprising a second binary feature vector of a plurality of feature points that are different from those of the first fingerprint, the feature points in the first and second fingerprints comprising at least one selected from an edge, a corner, a blob, or a ridge;
receive video footage from a camera configured to record video of apparatuses in the first assembled state, wherein the first assembled state comprises;
a first component of a first type; and
a second component, being one of the first type or a second type;
isolate a first frame comprising an image of an apparatus in the first assembled state;
split the first frame into a second frame comprising the first component of the first type, and a third frame comprising the second component;
generate a first set of feature points and a second set of feature points the first and second sets of feature points each comprising at least one selected from an edge, a corner, a blob, or a ridge;
determine that the first set of feature points matches the feature points comprising the first digital fingerprint;
determine that the second set of feature points matches the feature points comprising the second digital fingerprint;
generate a third digital fingerprint based on the apparatus in the first assembled state, wherein the third digital fingerprint comprises the first digital fingerprint and the second digital fingerprint; and
update a component database with:
the third digital fingerprint,
a date and time when the apparatus in the first assembled state was assembled; and
an indication that the apparatus in the first assembled state is associated with the first and second digital fingerprints.

14. The non-transitory computer-readable medium of claim 13, wherein the instructions, when executed by the hardware processor, further cause the hardware processor to:
receive an indication that an apparatus in a second assembled state should comprise an apparatus in the first assembled state with the third digital fingerprint;
receive video footage from a second camera configured to record video of apparatuses in the second assembled state, wherein the second assembled state comprises the apparatuses in the first assembled state combined with a third component, the third component being one of the first type, the second type, or a third type;
isolate a fourth frame comprising an image of an apparatus in the second assembled state;
generate a third set of feature points comprising at least one selected from an edge, a corner, a blob, or a ridge;
determine that the third set of feature points matches feature points comprising the third digital fingerprint;
update the component database with:
a fourth digital fingerprint based on the apparatus in the second assembled state;
a date and time when the apparatus in the second assembled state was assembled; and
an indication that the apparatus in the second assembled state is associated with the first, second, and/or third digital fingerprints.

15. The non-transitory computer-readable medium of claim 14, wherein the instructions, when executed by the hardware processor, further cause the hardware processor to:
receive an indication that an apparatus in a third assembled state should comprise an apparatus in the second assembled state with the fourth digital fingerprint;
receive video footage from a third camera configured to record video of apparatuses in the third assembled state, wherein the third assembled state comprises the apparatuses in the second assembled state, and wherein a color and/or texture change has occurred on the surface of one or more regions of the apparatuses in the second assembled state;
isolate a fifth frame comprising an image of an apparatus in the third assembled state;
generate a fourth set of feature points comprising at least one selected from an edge, a corner, a blob, or a ridge;
determine that the fourth set of feature points matches the feature points comprising the fourth digital fingerprint;
update the component database with:
a fifth digital fingerprint based on the apparatus in the third assembled state;
a date and time when the apparatus in the third assembled state was assembled; and
an indication that the apparatus in the second assembled state is associated with the first, second, third, and/or fourth digital fingerprints.

16. The non-transitory computer-readable medium of claim 15, wherein the instructions, when executed by the hardware processor, further cause the hardware processor to:
receive an indication that an apparatus in a tested state should comprise an apparatus in the third assembled state with the fifth digital fingerprint;
receive video footage from a fourth camera configured to record video of apparatuses in the tested state, wherein the tested state comprises the third assembled state that has been subject to a quality control test or a fully assembled state that has been subject to the quality control test;

isolate a sixth frame comprising an image of an apparatus in the tested state;

generate a fifth set of feature points comprising at least one selected from an edge, a corner, a blob, or a ridge;

determine that the fifth set of feature points matches the feature points comprising the fifth digital fingerprint;

determine that the apparatus in the tested state did not pass the quality control test;

determine the dates and times when the apparatus was assembled in the first assembled state, assembled in the second assembled state; and/or assembled in the third assembled state; and identify the other apparatuses manufactured within a time window comprising the dates and times when the apparatus was assembled in the first assembled state, assembled in the second assembled state, and/or assembled in the third assembled state.

17. The non-transitory computer-readable medium of claim 13, wherein determine that the first set of feature points matches the feature points comprising the first digital fingerprint:

identify feature points or groups of feature points in the first set of feature points that have some similarity to feature points or groups of feature points in the first digital fingerprint;

assign a confidence interval to each of the identified feature points or groups of feature points having some similarity;

calculate a correlation value, comprising the number of sets of similar points or groups of points whose confidence interval exceeds a first threshold; and determine that the correlation value exceeds a second threshold.

* * * * *